US012665727B2

(12) United States Patent
Zhu

(10) Patent No.: US 12,665,727 B2
(45) Date of Patent: Jun. 23, 2026

(54) HARQ CODEBOOK PROCESSING METHOD AND APPARATUS, AND COMMUNICATION DEVICE AND STORAGE MEDIUM

(71) Applicant: Beijing Xiaomi Mobile Software Co., Ltd., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 309 days.

(21) Appl. No.: 18/693,476

(22) PCT Filed: Sep. 26, 2021

(86) PCT No.: PCT/CN2021/120681
§ 371 (c)(1),
(2) Date: Mar. 19, 2024

(87) PCT Pub. No.: WO2023/044857
PCT Pub. Date: Mar. 30, 2023

(65) Prior Publication Data
US 2024/0430064 A1 Dec. 26, 2024

(51) Int. Cl.
*H04L 5/00* (2006.01)
*H04L 1/1812* (2023.01)
*H04L 1/1829* (2023.01)

(52) U.S. Cl.
CPC .......... *H04L 5/0055* (2013.01); *H04L 1/1854* (2013.01); *H04L 1/1812* (2013.01)

(58) Field of Classification Search
CPC ... H04L 5/0055; H04L 1/1854; H04L 1/1812; H04L 1/1861; H04L 1/1896; H04L 1/1822; H04L 1/1819
See application file for complete search history.

(56) References Cited

U.S. PATENT DOCUMENTS

| | | | | |
|---|---|---|---|---|
| 2020/0136763 A1* | 4/2020 | Lee | | H04L 1/0031 |
| 2022/0109527 A1* | 4/2022 | Hwang | | H04L 1/1864 |

(Continued)

FOREIGN PATENT DOCUMENTS

| | | |
|---|---|---|
| CN | 110034868 A | 7/2019 |
| CN | 110351018 A | 10/2019 |

(Continued)

OTHER PUBLICATIONS

"3rd Generation Partnership Project; Technical Specification Group Radio Access Network; NR; Physical layer procedures for control (Release 16)," 3GPP TS 38.213, V16.6.0, Jun. 2021, 187 pages.

(Continued)

*Primary Examiner* — Schquita D Goodwin
(74) *Attorney, Agent, or Firm* — McCoy Russell LLP

(57) ABSTRACT

A hybrid automatic repeat request (HARQ) codebook processing method, executed by a terminal, including: determining a size of an HARQ codebook according to a number N of configured K1 values and a number M of configured feedback-enabled HARQ processes, where the HARQ codebook carries an HARQ feedback for a downlink transmission, and the K1 values each indicate a time offset between a transmission resource for the HARQ feedback and a transmission resource for the downlink transmission.

20 Claims, 5 Drawing Sheets

(56) References Cited

U.S. PATENT DOCUMENTS

| | | | | |
|---|---|---|---|---|
| 2023/0269034 A1* | 8/2023 | Karaki | ................. | H04L 5/0053 |
| | | | | 370/329 |
| 2024/0171320 A1* | 5/2024 | Ijaz | ...................... | H04W 76/28 |
| 2024/0340106 A1* | 10/2024 | Nishio | ................. | H04L 1/1614 |

FOREIGN PATENT DOCUMENTS

| | | | |
|---|---|---|---|
| CN | 110460413 | A | 11/2019 |
| CN | 111294186 | A | 6/2020 |
| CN | 111684749 | A | 9/2020 |
| CN | 111865506 | A | 10/2020 |
| CN | 112511275 | A | 3/2021 |
| CN | 112822775 | A | 5/2021 |
| CN | 112929981 | A | 6/2021 |
| WO | 2021033116 | A1 | 2/2021 |
| WO | 2021088493 | A1 | 5/2021 |

OTHER PUBLICATIONS

"3rd Generation Partnership Project; Technical Specification Group Radio Access Network; NR; Radio Resource Control (RRC) protocol specification (Release 16)," 3GPP TS 38.331, V16.5.0, Jun. 2021, 102 pages.

"Discussion on HARQ enhancement for NTN," Proceedings of the 3GPP TSG RAN WG1 Meeting #106-e, Huawei, HiSilicon, R1-2106484, Aug. 16, 2021, E-Meeting, 9 pages.

"Discussion on HARQ enhancements for NR-NTN," Proceedings of the 3GPP TSG RAN WG1 #106-e, Vivo, R1-2106593, Aug. 16, 2021, E-Meeting, 4 pages.

"Discussion on HARQ enhancement for NTN," Proceedings of the 3GPP TSG RAN WG1 #106-e, Baicells, R1-2106756, Aug. 16, 2021, E-Meeting, 4 pages.

"Enhancements on HARQ for NTN," Proceedings of the 3GPP TSG RAN WG1 #106-e, Sony, R1-2106807, Aug. 16, 2021, E-Meeting, 5 pages.

"HARQ Aspects for NTN," Proceedings of the 3GPP TSG RAN WG1 #106-e, Samsung, R1-2106886, Aug. 16, 2021, E-Meeting, 6 pages.

"HARQ operation enhancement for NTN," Proceedings of the 3GPP TSG RAN WG1 #106-e, CATT, R1-2106969, Aug. 16, 2021, E-Meeting, 6 pages.

"Discussion on HARQ enhancements for NR NTN," Proceedings of the 3GPP TSG RAN WG1 #106-e, NEC, R1-2107015, Aug. 16, 2021, E-Meeting, 5 pages.

"Enhancements on HARQ to support NTN," Proceedings of the 3GPP TSG RAN WG1 #106-e, CAICT, R1-2107168, Aug. 16, 2021, E-Meeting, 5 pages.

"Enhancements on HARQ for NTN," Proceedings of the 3GPP TSG RAN WG1 #106-e, Qualcomm Incorporated, R1-2107343, Aug. 16, 2021, E-Meeting, 9 pages.

"Enhancements on HARQ for NTN," Proceedings of the 3GPP TSG RAN WG1 #106-e, CMCC, R1-2107401, Aug. 16, 2021, E-Meeting, 4 pages.

"Discussions on HARQ enhancements in NTN," Proceedings of the 3GPP TSG RAN WG1 #106-e, LG Electronics, R1-2107540, Aug. 16, 2021, E-Meeting, 6 pages.

"On HARQ enhancements for NTN," Proceedings of the 3GPP TSG RAN WG1 #106-e, Ericsson, R1-2107638, Aug. 16, 2021, E-Meeting, 11 pages.

* cited by examiner

S110: Determine a size of an HARQ codebook
according to a number N of configured K1 values and
a number M of configured feedback-enabled HARQ
processes

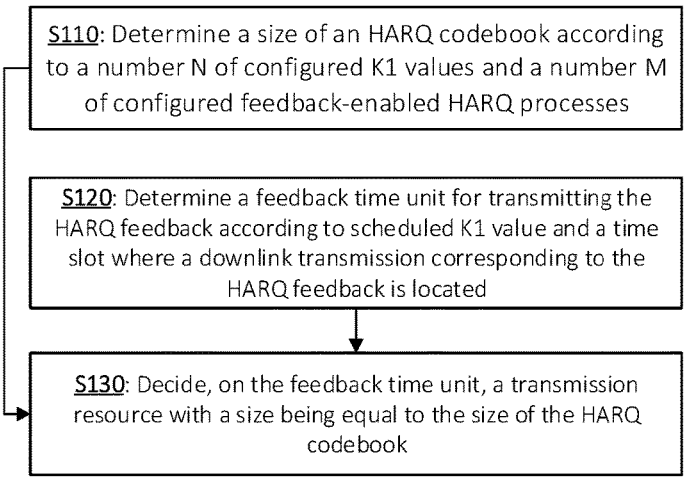

S110: Determine a size of an HARQ codebook according to a number N of configured K1 values and a number M of configured feedback-enabled HARQ processes S120: Determine a feedback time unit for transmitting the HARQ feedback according to scheduled K1 value and a time slot where a downlink transmission corresponding to the HARQ feedback is located S130: Decide, on the feedback time unit, a transmission resource with a size being equal to the size of the HARQ codebook

Figure 3

| Scheduled feedback-enabled HARQ process #1, corresponding scheduled K1 value being 13 | Scheduled feedback-enabled HARQ process #3, corresponding scheduled K1 value being 4 | Unscheduled feedback-enabled HARQ process #5 | Scheduled feedback-enabled HARQ process #7, corresponding scheduled K1 value being 3 | Scheduled feedback-enabled HARQ process #8, corresponding scheduled K1 value being 15 |
|---|---|---|---|---|
| ACK | NACK | NACK | ACK | ACK |

Figure 4A

| Scheduled feedback-enabled HARQ process #1, corresponding scheduled K1 value being 13 | Scheduled feedback-enabled HARQ process #3, corresponding scheduled K1 value being 4 | Scheduled feedback-enabled HARQ process #7, corresponding scheduled K1 value being 3 | Scheduled feedback-enabled HARQ process #8, corresponding scheduled K1 value being 15 | Unscheduled feedback-enabled HARQ process #5 |
|---|---|---|---|---|
| ACK | NACK | ACK | ACK | NACK |

Figure 4B

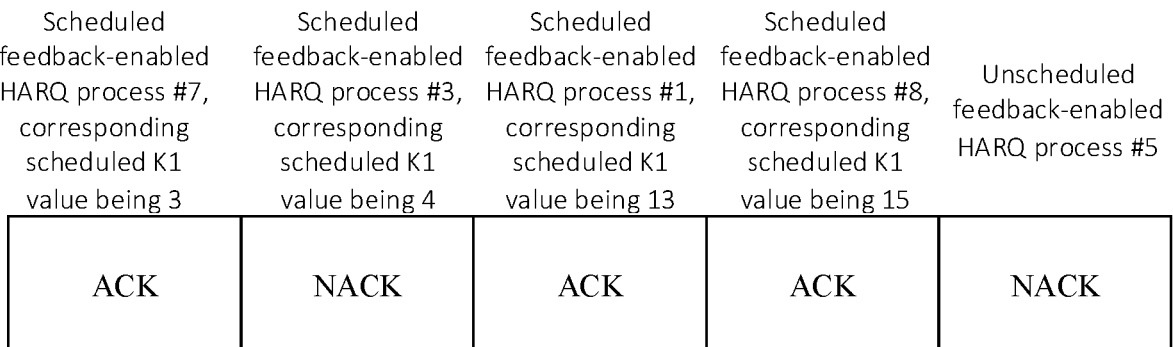

| Scheduled feedback-enabled HARQ process #7, corresponding scheduled K1 value being 3 | Scheduled feedback-enabled HARQ process #3, corresponding scheduled K1 value being 4 | Scheduled feedback-enabled HARQ process #1, corresponding scheduled K1 value being 13 | Scheduled feedback-enabled HARQ process #8, corresponding scheduled K1 value being 15 | Unscheduled feedback-enabled HARQ process #5 |
|---|---|---|---|---|
| ACK | NACK | ACK | ACK | NACK |

Figure 4C

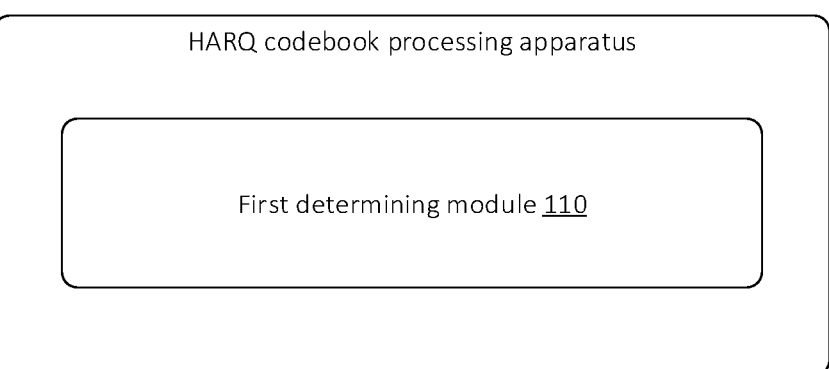

S210: Determine a size of an HARQ codebook according to a number N of configured K1 values and a number M of configured feedback-enabled HARQ processes

Figure 5

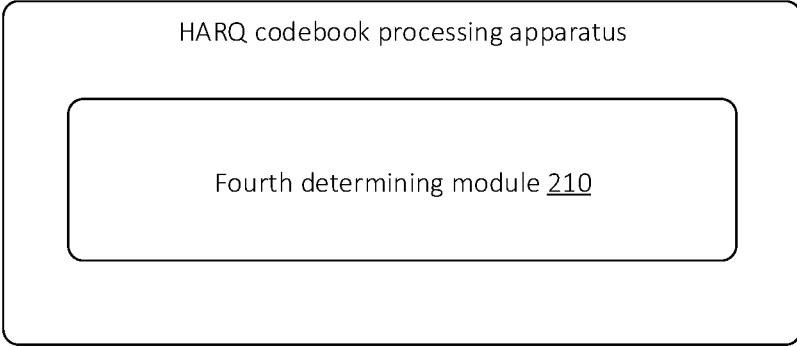

HARQ codebook processing apparatus

First determining module 110

Figure 6

HARQ codebook processing apparatus

Fourth determining module 210

Figure 7

HARQ CODEBOOK PROCESSING METHOD AND APPARATUS, AND COMMUNICATION DEVICE AND STORAGE MEDIUM

CROSS-REFERENCE TO RELATED APPLICATIONS

The present application is a U.S. National Stage of International Application No. PCT/CN2021/120681, entitled "HARQ CODEBOOK PROCESSING METHOD AND APPARATUS, AND COMMUNICATION DEVICE AND STORAGE MEDIUM", filed on Sep. 26, 2021, the contents of which are incorporated herein by reference in their entireties for all purposes.

BACKGROUND OF THE INVENTION

A semi-static hybrid automatic repeat request (HARQ) codebook is used for transmitting an HARQ feedback for a downlink transmission such as a physical downlink shared channel (PDSCH) or a physical downlink control channel (PDCCH). The HARQ feedback may include acknowledgement (ACK) and non acknowledgement (NACK).

SUMMARY OF THE INVENTION

The disclosure relates to, but is not limited to, the technical field of wireless communications, in particular to an HARQ codebook processing method and apparatus, a communication device and a storage medium.

A first aspect of an example of the disclosure provides a hybrid automatic repeat request (HARQ) codebook processing method, executed by a terminal and including: determining a size of an HARQ codebook according to a number N of configured K1 values and a number M of configured feedback-enabled HARQ processes, where the HARQ codebook carries an HARQ feedback for a downlink transmission; and the K1 values each indicate a time offset between a transmission resource for the HARQ feedback and a transmission resource for the downlink transmission.

A second aspect of an example of the disclosure provides a hybrid automatic repeat request (HARQ) codebook processing method, executed by a base station and including: determining a size of an HARQ codebook according to a number N of configured K1 values and a number M of configured feedback-enabled HARQ processes, where the HARQ codebook carries an HARQ feedback for a downlink transmission; and the K1 values each indicate a time offset between a transmission resource for the HARQ feedback and a transmission resource for the downlink transmission.

A third aspect of an example of the disclosure provides a hybrid automatic repeat request (HARQ) codebook processing apparatus, including: a first determining module, configured to determine a size of an HARQ codebook according to a number N of configured K1 values and a number M of configured feedback-enabled HARQ processes, where the HARQ codebook carries an HARQ feedback for a downlink transmission; and the K1 values each indicate a time offset between a transmission resource for the HARQ feedback and a transmission resource for the downlink transmission.

A fourth aspect of an example of the disclosure provides a hybrid automatic repeat request (HARQ) codebook processing apparatus, including: a fifth determining module, configured to determine a size of an HARQ codebook according to a number N of configured K1 values and a number M of configured feedback-enabled HARQ processes, where the HARQ codebook carries an HARQ feedback for a downlink transmission; and the K1 values each indicate a time offset between a transmission resource for the HARQ feedback and a transmission resource for the downlink transmission.

A fifth aspect of an example of the disclosure provides a communication device, including one or more processors, a transceiver, a memory and an executable program stored on the memory and capable of being run by the one or more processors, where the one or more processors, when running the executable program, executes the HARQ codebook processing method provided by the first aspect or the second aspect described above.

A sixth aspect of an example of the disclosure provides a non-transitory computer storage medium, the non-transitory computer storage medium storing an executable program; and the executable program, when executed by one or more processors, being capable of implementing the HARQ codebook processing method provided by the first aspect or the second aspect described above.

BRIEF DESCRIPTION OF DRAWINGS

Accompanying drawings, which are incorporated in and constitute a part of the specification, illustrate examples consistent with the disclosure and, together with the specification, serve to explain principles of the examples of the disclosure.

FIG. 3 is a schematic flowchart of an HARQ codebook processing method according to an example.

FIG. 4A is a schematic diagram of an HARQ codebook according to an example.

FIG. 4B is a schematic diagram of an HARQ codebook according to an example.

FIG. 4C is a schematic diagram of an HARQ codebook according to an example.

FIG. 5 is a schematic flowchart of an HARQ codebook processing method according to an example.

FIG. 6 is a schematic structural diagram of an HARQ codebook processing apparatus according to an example.

FIG. 7 is a schematic structural diagram of an HARQ codebook processing apparatus according to an example.

DETAILED DESCRIPTION OF THE INVENTION

The examples will be described in detail, and their instances are represented in the accompanying drawings. Unless otherwise indicated, when the following description refers to the accompanying drawings, the same number in different accompanying drawings represents the same or similar elements. Implementations described in the following examples do not represent all implementations consistent with the examples of the disclosure. Rather, they are examples of an apparatus and method consistent with some aspects of the examples of the disclosure as detailed in appended claims.

Terms used in the examples of the disclosure are intended to describe specific examples but not to limit the examples of the disclosure. A singular form "a", "an" and "the" used in the examples and the appended claims of the disclosure is also intended to include a plural form unless other meanings are indicated clearly in the context. It is to be further understood that a term "and/or" used refers to and contains any one or all possible combinations of one or a plurality of associated listed items.

It is to be understood that various information, possibly described by using terms such as first, second and third in the examples of the disclosure, is not limited to these terms. These terms are used for distinguishing the same type of information. For example, without departing from the scope of the examples of the disclosure, first information may also be called second information, and similarly, the second information may also be called the first information. Depending on the context, words such as "if" may be construed as "when . . . ", or "while . . . " or "in response to determining".

Figures 1, 2:
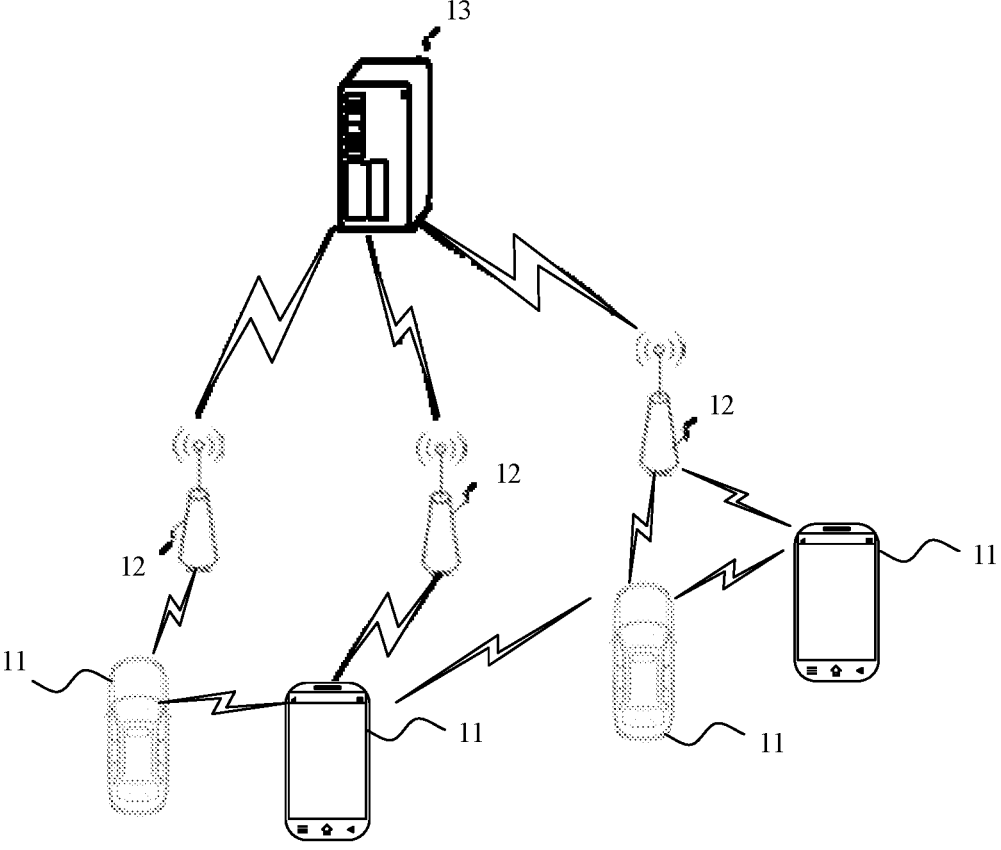
FIG. 1 is a schematic structural diagram of a wireless communication system according to an example.
FIG. 2 is a schematic flowchart of an HARQ codebook processing method according to an example.

Please refer to FIG. 1, which shows a schematic structural diagram of a wireless communication system according to an example of the disclosure. As shown in FIG. 1, the wireless communication system is a communication system based on a cellular mobile communication technology. The wireless communication system may include a plurality of UEs 11 and a plurality of base stations 12.

The UE 11 may refer to a device providing speech and/or data connectivity for a user. The UE 11 may communicate with one or a plurality of core networks via a radio access network (RAN). The UE 11 may be an Internet of Things UE, for example, a sensor device, a mobile phone (or called "cellular" phone) and a computer with the Internet of Things UE, for example, may be a fixed, portable, pocket, hand-held, built-in-computer or vehicle-mounted apparatus. For example, the UE 11 may be a station (STA), a subscriber unit, a subscriber station, a mobile station, a mobile, a remote station, an access point, a remote UE (a remote terminal), an access UE (an access terminal), a user terminal, a user agent, a user device, or a user equipment (UE). Alternatively, the UE 11 may also be a device of an unmanned aerial vehicle. Alternatively, the UE 11 may also be a vehicle-mounted device, for example, may be a trip computer with a wireless communication function, or a wireless communication device externally connected with the trip computer. Alternatively, the UE 11 may also be a road-side unit, for example, may be a street lamp, a signal lamp, or other road-side units with a wireless communication function.

The base station 12 may be a network device in the wireless communication system. The wireless communication system may be the 4$^{th}$ generation mobile communication (4G) system, or is also called long term evolution (LTE) system. Alternatively, the wireless communication system may be a 5G system, or is also called new radio (NR) system or 5G NR system. Alternatively, the wireless communication system may be a next generation system of the 5G system. An access network in the 5G system may be called a new generation-radio access network (NG-RAN). Alternatively, the wireless communication system may be a machine type communication (MTC) system.

The base station 12 may be an evolved base station (eNB) adopted in the 4G system. Alternatively, the base station 12 may be a base station adopting a centralized-distributed architecture (gNB) in the 5G system. In a case that the base station 12 adopts the centralized-distributed architecture, the base station 12 generally includes a central unit (CU) and at least two distributed units (DU). The central unit is provided with protocol stacks of a packet data convergence protocol (PDCP) layer, a radio link control (RLC) layer, a media access control (MAC) layer. The distributed unit is provided with a protocol stack of a physical (PHY) layer. The implementations of the base station 12 are not limited by the examples of the disclosure.

Wireless connection may be established between the base station 12 and the UE 11 through a wireless air interface. In various implementations, the wireless air interface may be a wireless air interface based on a 4th generation mobile communication network technology (4G) standard. Alternatively, the wireless air interface may be a wireless air interface based on a 5th generation mobile communication network technology (5G) standard, for example, the wireless air interface may be a new radio. Alternatively, the wireless air interface may be a wireless air interface based on a next-generation mobile communication network technology standard of 5G.

In some examples, an end to end (E2E) connection may also be established between the UEs 11, for example, vehicle to vehicle (V2V) communication, vehicle to Infrastructure (V2I) communication and vehicle to pedestrian (V2P) communication and other scenes in vehicle to everything (V2X).

In some examples, the above wireless communication system may further include a network management device 13.

The plurality of base stations 12 are connected respectively with the network management device 13. The network management device 13 may be a core network device in the wireless communication system. For example, the network management device 13 may be a mobility management entity (MME) in an evolved packet core (EPC). Alternatively, the network management device may also be another core network device, for example, a serving gateway (SGW), a public data network gateway (PGW), a policy and charging rules function (PCRF), a home subscriber server (HSS) or the like. The examples of the disclosure do not limit the implementation forms of the network management device 13.

A semi-static hybrid automatic repeat request (HARQ) codebook is used for transmitting an HARQ feedback for a downlink transmission such as a physical downlink shared channel (PDSCH) or a physical downlink control channel (PDCCH). The HARQ feedback may include acknowledgement (ACK) and non acknowledgement (NACK).

However, in a case that transmission delay is long, a feedback for an HARQ process is closed. In this case, continuing to use the semi-static HARQ codebook may cause unnecessary overhead.

As shown in FIG. 2, an example of the disclosure provides an HARQ codebook processing method. The HARQ codebook processing method is executed by a terminal and includes step S110.

Step S110 includes determining a size of an HARQ codebook according to a number N of configured K1 values and a number M of configured feedback-enabled HARQ processes, where the HARQ codebook carries an HARQ feedback for a downlink transmission.

The K1 values each indicate a time offset between a transmission resource for the HARQ feedback and a transmission resource for the downlink transmission.

The terminal may be a terminal of various types, including but is not limited to: a mobile phone, a tablet computer, a wearable device, a vehicle-mounted device, a smart home device and/or a smart office device, etc.

The terminal may be an enhanced mobile broadband (eMBB) terminal or a narrow band terminal. For example, the narrow band terminal includes but is not limited to: reduced capability (Redcap) UE.

The HARQ codebook involved in the HARQ codebook processing method provided by the example of the disclosure may be a type-1 HARQ codebook. The type-1 HARQ codebook may be a semi-static codebook.

The downlink transmission may be any transmission needing to be fed back and sent by a base station to the terminal. For example, the downlink transmission includes but is not limited to: at least one of a physical downlink shared channel (PDSCH) transmission or a PDCCH transmission for which a terminal needs to give a feedback on reception. The PDCCH transmission for which a terminal needs to give the feedback on reception includes but is not limited to: downlink control information (DCI) released by semi-persistent scheduling (SPS). The DCI released by the SPS is a kind of the PDCCH transmissions.

The time offset in the example of the disclosure may be an offset of a time unit. The time unit may be a time slot. In a case that the time unit is the time slot, the K1 value is a number of the time slots that are offset. In a case that the time unit is a symbol, the K1 value is a number of the symbols.

In an example of the disclosure, the K1 value is a numerical value, and may be any value between 1 and 8, or 0 and 15, or 0 and 31. It is to be understood that the description here is an example of the K1 value.

In some examples, the K1 value may be a non-numerical value. In a case that the K1 value is the non-numerical value, it may be determined that the UE does not need to make the HARQ feedback for the downlink transmission in the type-1 HARQ codebook. In this case, a value of N is a number of K1 values configured as the numerical value.

In an example of the disclosure, the feedback-enabled HARQ process is that: the terminal needs to, according to a receiving condition for corresponding downlink transmission, feed back ACK in a case that the corresponding downlink transmission is received successfully and feed back NACK in a case that the corresponding downlink transmission is not received successfully or is decoded unsuccessfully. In this way, the base station may determine whether the corresponding downlink transmission needs to be retransmitted according to returned HARQ feedback.

A feedback-disabled HARQ process is an HARQ process that the terminal does not need to send the HARQ feedback to the base station according to the receiving condition for the corresponding downlink transmission.

The HARQ feedback may include: ACK and/or NACK.

In an example of the disclosure, the size of the HARQ codebook is determined by comprehensively considering the number of the configured K1 values and the number of the configured feedback-enabled HARQ processes. Compared with determining the HARQ codebook merely according to the number of the configured K1 values, a phenomenon of too large overhead of the HARQ codebook due to the HARQ codebook being configured very large in a case that the number of the configured feedback-enabled HARQ processes is small may be at least reduced, thus redundancy of the HARQ codebook is reduced, and bit overhead is reduced. Furthermore, the size of the HARQ codebook is determined according to the number of the configured K1 values and the number of the configured feedback-enabled HARQ processes, thus in a case that configurations for the K1 values and the feedback-enabled HARQ processes are determined, the HARQ codebook is accordingly determined, and the HARQ codebook may be used continuously within one or more follow-up semi-persistent periods, so a semi-static characteristic of the type-1 HARQ codebook is met.

A transmission resource for the HARQ codebook is an uplink resource. The HARQ codebook is an uplink transmission.

In some examples, the K1 value indicates an offset between a time unit where the downlink transmission is located and a time unit for the HARQ codebook transmission.

Taking the time unit being the time slot as an example, the K1 value is used for determining a time offset between a time slot where the downlink transmission corresponding to the HARQ codebook is located and an uplink time slot where the HARQ codebook is located. K1 may be 0 or a positive integer.

In some examples, the configuration of the K1 values may be carried by radio resource control (RRC) signaling; and scheduling of the K1 values may be carried by DCI. For example, all alternative values of the K1 values are configured through the RRC signaling. During specific application, actually used K1 values are selected from the alternative values by using DCI with a good dynamic property and are informed to the terminal, and thus scheduling of the K1 values is implemented.

In some examples, determining the size of the HARQ codebook according to the number N of the configured K1 values and the number M of the configured feedback-enabled HARQ processes includes:

determining the size of the HARQ codebook according to min {M, N}.

M may be greater than N. Alternatively, M may be equal to N. Alternatively, M may be smaller than N. In view of this, determining the size of the HARQ codebook according to min {M, N} includes at least one of:

determining the size of the HARQ codebook according to N in a case that M is greater than N;

determining the size of the HARQ codebook according to N or M in a case that M is equal to N; or determining the size of the HARQ codebook according to M in a case that M is smaller than N.

The size of the HARQ codebook may be measured by using a number of bits.

For example, it is assumed that a UE has merely one serving cell, one transmission block (TB) carries NACK or ACK by one bit for feedback, and it is assumed that S TBs of the downlink transmission may be scheduled most possibly in each scheduling time slot, and the K1 values are {1, 2, 3, 4, 5, 6, 7, 8}, then N=8. It is assumed that the number of the configured feedback-enabled HARQ processes is M=2. It may be known that in a case that M is smaller than N, the size of the HARQ codebook is determined according to M. In this case, the size of the HARQ codebook may be: M*S bits. Compared with N*S, the size of the HARQ codebook is reduced.

In some examples, determining the size of the HARQ codebook according to min {M, N} includes at least one of:

determining that the size of the HARQ codebook is 0 in a case that M is smaller than N and M is equal to 0; or determining the size of the HARQ codebook according to min {M, N} and an HARQ feedback strategy in a case that M is greater than 0.

In some examples, the HARQ codebook is a type-1 HARQ codebook. In this case, the number of configured numerical K1 values is an integer equal to or greater than 0.

It needs to be noted that the above description is for a certain serving cell. For example, 'determining that the size of the HARQ codebook is 0 in a case that M is smaller than N and M is equal to 0' refers to that HARQ information corresponding to this serving cell does not need to be fed back in a case that the number of the HARQ processes enabled by this serving cell is 0, and the size of the HARQ codebook for this serving cell in the HARQ codebook is 0. In a case that the UE is further provided with another serving cell at the same time, and the number of the feedback-enabled HARQ processes in this another serving cell is greater than 0, the HARQ codebook still includes the HARQ feedback for this another serving cell.

That is, in the examples of the disclosure, processing of the HARQ codebook is for a single cell. In a case that different cells may use the above method or a method in related art, HARQ codebooks for corresponding cells are determined respectively. For example, in a case that one UE has two serving cells, two HARQ codebooks may be determined respectively according to the above method. In a case that the UE has a plurality of serving cells, a size of an HARQ codebook for one serving cell is 0, which does not affect a size of an HARQ codebook for another serving cell.

In an example of the disclosure, in a case that the base station does not configure the numerical K1 values, that is, the configured K1 values are non-numerical values, it may also be determined that the size of the HARQ codebook is 0, or the HARQ codebook does not need to be transmitted, and thus resources consumed by HARQ codebook transmission in this case are saved.

In a case that M is smaller than N and equal to 0, the size of the HARQ codebook is 0, that is, the terminal does not send the HARQ codebook to the base station, and the base station does not receive the HARQ codebook from the terminal, so that transmission overhead is not caused by the HARQ codebook.

In a case that M is not equal to 0, the size of the HARQ codebook is determined according to a smaller value of M and N and the HARQ feedback strategy.

Various HARQ feedback strategies exist according to different feedback granularities. For example, one TB may include one or more code block groups (CBGs). A first feedback strategy is to perform the HARQ feedback for each TB. A second feedback strategy may be to perform the HARQ feedback for each CBG in the TB. It is to be understood that the description here is an example of the HARQ feedback strategy, and the HARQ feedback strategy is not limited to this during specific implementations.

In some examples, as shown in FIG. 3, the method further includes steps S120 and S130.

Step S120 includes determining a feedback time unit for transmitting the HARQ feedback according to scheduled K1 value and a time slot where the downlink transmission corresponding to the HARQ feedback is located.

Step S130 includes determining, on the feedback time unit, a transmission resource with a size being equal to the size of the HARQ codebook.

Scheduling of the K1 values may be implemented by the DCI. For example, the terminal receives the DCI sent by the base station, and the scheduled K1 values are determined according to the DCI.

In a case that the K1 value indicates a time slot offset, the feedback time slot for transmitting the HARQ feedback may be determined according to the K1 value and in combination with a time slot where the downlink transmission corresponding to the corresponding HARQ feedback is located, and the transmission resource with the size being equal to the size of the HARQ codebook is determined on this feedback time slot. For example, after determining the transmission resource with the size being equal to the size of the HARQ codebook, corresponding number of transmission resources may be reserved or scheduled.

In a case that the K1 value indicates a symbol offset, the feedback symbol for transmitting the HARQ feedback may be determined according to the K1 value and in combination with the time slot where the downlink transmission corresponding to the corresponding HARQ feedback is located, and the transmission resource with the size being equal to the size of the HARQ codebook is determined on this feedback symbol.

The maximum number of scheduled feedback-enabled HARQ processes may be equal to the number of the configured feedback-enabled HARQ processes. In a case that the number of scheduled feedback-enabled HARQ processes is scheduled feedback-enabled HARQ equal to the number of the configured feedback-enabled HARQ processes, whether the corresponding HARQ feedback is ACK or NACK is determined according to a receiving condition for the downlink transmission corresponding to each feedback-enabled HARQ process, and the determined HARQ feedback is written in the HARQ codebook.

In some examples, the number of scheduled feedback-enabled HARQ processes is smaller than the number of the configured feedback-enabled HARQ processes, and the HARQ feedback carried by the HARQ codebook includes at least one of:

an HARQ feedback determined according to a receiving condition for the downlink transmission corresponding to the scheduled feedback-enabled HARQ process; or an HARQ feedback for an unscheduled feedback-enabled HARQ process, where the HARQ feedback for the unscheduled feedback-enabled HARQ process is a preset value, and the preset value is non acknowledgement (NACK) or acknowledgement (ACK).

The preset value may be a value regulated by a protocol or a value pre-negotiated between the base station and the terminal.

During the writing of the HARQ feedback into the HARQ codebook, the terminal, for writing of the HARQ feedback for the unscheduled feedback-enabled HARQ process, writes the preset value.

In an example, as the base station knows the feedback-enabled HARQ processes scheduled by itself, the terminal may further writes NACK or ACK at will without being limited to writing the preset value.

In some examples, the method further includes:

not feeding back the HARQ codebook in a case that a number of scheduled feedback-enabled HARQ processes is 0; or determining that the HARQ codebook carries the preset value in a case that a number of scheduled feedback-enabled HARQ processes is 0, where the preset value is NACK or ACK.

It can be negotiated between the base station and the terminal that no HARQ codebook will be fed back in a case that the number of scheduled feedback-enabled HARQ processes is 0, so that unnecessary transmission is reduced.

It needs to be noted that in the examples of the disclosure, determining of the HARQ codebook with whatever size or the HARQ codebook determined in whatever condition is for a certain serving cell. For example, 'determining that the size of the HARQ codebook is 0 in a case that M is smaller than N and M is equal to 0' refers to that HARQ information corresponding to this serving cell does not need to be fed back in a case that the number of the HARQ processes enabled by this serving cell is 0, and the size of the HARQ codebook for this serving cell in the HARQ codebook is 0. In a case that the UE is further provided with another serving cell at the same time, and the number of the feedback-enabled HARQ processes in this another serving cell is greater than 0, the HARQ codebook still includes the HARQ feedback for this another serving cell.

That is, in the examples of the disclosure, processing of the HARQ codebook is for a single cell. In a case that different cells may use the above method or a method in related art, HARQ codebooks for corresponding cells are determined respectively. For example, in a case that one UE has two serving cells, two HARQ codebooks may be determined respectively according to the above method. In a case that the UE has a plurality of serving cells, a size of an HARQ codebook for one serving cell is 0, which does not affect a size of an HARQ codebook for another serving cell.

The HARQ codebook in which the HARQ feedbacks are written is sent to the base station according to the determined size of the HARQ codebook in a case that the number of scheduled feedback-enabled HARQ processes is not 0.

In some examples, a sequence of the HARQ feedbacks in the HARQ codebook is determined according to identifications (IDs) of scheduled HARQ processes corresponding to the HARQ feedbacks.

Alternatively, the sequence of the HARQ feedbacks in the HARQ codebook is determined according to the scheduled K1 values corresponding to the HARQ feedbacks.

Alternatively, the sequence of the HARQ feedbacks in the HARQ codebook is determined according to IDs of the feedback-enabled HARQ processes corresponding to the HARQ feedbacks.

The HARQ processes each have a process identification (ID). The HARQ feedbacks for different HARQ processes may be sequenced according to the process IDs from small to large and then sequentially written in the HARQ codebook. Alternatively, the HARQ feedbacks may be sequenced according to the process IDs from large to small and then sequentially written in the HARQ codebook.

In a case that the number of the scheduled feedback-enabled HARQ processes is equal to the number of the configured feedback-enabled HARQ processes, the HARQ feedbacks for the downlink transmissions of the corresponding feedback-enabled HARQ processes all need to be written in the HARQ codebook, and a sequence in which the HARQ feedbacks are written may also be determined according to the IDs of the scheduled HARQ processes. In a case that the number of the scheduled feedback-enabled HARQ processes is smaller than the number of the configured feedback-enabled HARQ processes, the corresponding HARQ feedbacks may also be sequenced according to the IDs of the scheduled feedback-enabled HARQ processes and then written in the HARQ codebook, and then a preset value is written in remaining bits of the HARQ codebook.

In some examples, the HARQ feedbacks may be sequenced according to the K1 values corresponding to the HARQ feedbacks from large to small and then sequentially written in the HARQ codebook. Alternatively, the HARQ feedbacks may be sequenced according to the K1 values corresponding to the HARQ feedbacks from small to large and then sequentially written in the HARQ codebook. In this case, for the unscheduled feedback-enabled HARQ process, there may not have a scheduled K1 value. In this case, the preset value may be written in the remaining bits of the HARQ codebook after the HARQ feedbacks for the scheduled feedback-enabled HARQ processes are written in the HARQ codebook. Alternatively, the preset value is written in the HARQ codebook according to the number of bits where the HARQ feedbacks for the unscheduled feedback-enabled HARQ processes are located, and then the HARQ feedbacks for the scheduled feedback-enabled HARQ processes are written in the HARQ codebook correspondingly according to a sequence of the K1 values.

In a case that the number of the scheduled feedback-enabled HARQ processes is equal to the number of the configured feedback-enabled HARQ processes, the HARQ feedbacks for the downlink transmissions of the corresponding feedback-enabled HARQ processes all need to be written in the HARQ codebook. In this case, a sequence of writing the HARQ feedbacks for the processes in the HARQ codebook may be determined according to a sequence of the scheduled K1 values. In a case that the number of scheduled feedback-enabled HARQ processes is smaller than the number of the configured feedback-enabled HARQ processes, the corresponding scheduled K1 values may be sequenced, and then the HARQ feedbacks may be written in the HARQ codebook according to the sequence of the K1 values.

In some examples, sequencing may be performed directly according to the IDs of the configured feedback-enabled HARQ processes. In a case that corresponding feedback-enabled HARQ process is scheduled, the HARQ feedback may be written in corresponding sequencing position of the HARQ codebook according to the receiving condition for corresponding downlink transmission, and the preset value may be written in bits of the HARQ codebook corresponding to the ID of the unscheduled feedback-enabled HARQ process.

In some examples, the downlink transmission includes at least one of:

a physical downlink shared channel (PDSCH) transmission; or a scheduling transmission released by a semi-persistent physical downlink shared channel.

As shown in FIG. 5, an example of the disclosure provides a hybrid automatic repeat request (HARQ) codebook processing method. The HARQ codebook processing method is executed by a base station and includes step S210.

Step S210 includes determining a size of an HARQ codebook according to a number N of configured K1 values and a number M of configured feedback-enabled HARQ processes.

The HARQ codebook carries an HARQ feedback for a downlink transmission.

The K1 values each indicate a time offset between a transmission resource for the HARQ feedback and a transmission resource for the downlink transmission.

The HARQ codebook processing method provided by the example of the disclosure is performed by the base station. The base station, before receiving the HARQ codebook, may determine a size of a semi-static HARQ codebook according to the number of K1 values and the number of the feedback-enabled HARQ processes configured by itself, and subsequently may receive the HARQ codebook sent by a terminal according to the determined size of the semi-static HARQ codebook. Whether corresponding downlink transmission needs to be retransmitted may be determined according to the HARQ feedback carried in the HARQ codebook.

The downlink transmission may include at least one of a PDSCH transmission or a PDCCH transmission as mentioned in the above examples.

In the examples of the disclosure, the size of the HARQ codebook is determined according to the number of the configured K1 values or the number of the configured feedback-enabled HARQ processes. Compared with determining merely according to the number of the configured K1 values, the size of the HARQ codebook may be reduced in whole and redundancy of the HARQ codebook is reduced.

In some examples, determining the size of the HARQ codebook according to the number N of the configured K1 values and the number M of the configured feedback-enabled HARQ processes includes: determining the size of the HARQ codebook according to min {M, N}.

For example, a value range of N may be a positive integer, and a value rang of M may be 0 or a positive integer.

The size of the HARQ codebook is in positive correlation with min {M, N}. That is, as for a single HARQ feedback mechanism, the greater a smaller value of M and N is, the greater the size of the HARQ codebook is, and vice versa.

In some examples, determining the size of the HARQ codebook according to min {M, N} includes at least one of:

determining that the size of the HARQ codebook is 0 in a case that M is smaller than N and M is equal to 0; or determining the size of the HARQ codebook according to min {M, N} and an HARQ feedback strategy in a case that M is greater than 0.

The HARQ codebook does not need to be transmitted between the base station and the terminal in a case that the size of the HARQ codebook is 0.

In a case that M is not equal to 0, the size of the HARQ codebook is determined in combination with min {M, N} and the HARQ feedback strategy. Description of the HARQ feedback strategy may refer to the above examples and will not be repeated here.

In some examples, the method further includes: determining a feedback time unit for transmitting the HARQ feedback according to scheduled K1 value and a time slot where the downlink transmission corresponding to the HARQ feedback is located; and determining, on the feedback time unit, a transmission resource with a size being equal to the size of the HARQ codebook.

Further, the base station may receive the HARQ codebook sent by the terminal on the determined transmission resource.

In some examples, the number of scheduled feedback-enabled HARQ processes is smaller than the number of the configured feedback-enabled HARQ processes, and the HARQ feedback carried by the HARQ codebook includes at least one of:

an HARQ feedback determined according to a receiving condition for the downlink transmission corresponding to the scheduled feedback-enabled HARQ process; or an HARQ feedback for an unscheduled feedback-enabled HARQ process, where the HARQ feedback for the unscheduled feedback-enabled HARQ process is a preset value, and the preset value is non acknowledgement (NACK) or acknowledgement (ACK).

In a case that the number of scheduled feedback-enabled HARQ processes is smaller than the number of the configured feedback-enabled HARQ processes, a part of bit redundancy remains in the HARQ codebook. These redundant bits are originally configured for transmitting the HARQ feedback for an unscheduled feedback-enabled HARQ process, but as the corresponding feedback-enabled HARQ process is unscheduled, these redundant bits may be used for directly writing a preset value or randomly writing NACK or ACK. The base station, after receiving, may perform decoding according to the HARQ feedback commonly known for the unscheduled feedback-enabled HARQ process between the terminal and the base station, so as to know which of scheduled feedback-enabled HARQ processes need to be retransmitted or whether the corresponding downlink transmission needs to be sent.

In some examples, the method further includes at least one of:

determining not to receive the HARQ codebook in a case that the number of scheduled feedback-enabled HARQ processes is 0; or determining that the HARQ codebook carries a preset value in a case that the number of scheduled feedback-enabled HARQ processes is 0, where the preset value is NACK or ACK.

In a case that the number of the scheduled feedback-enabled HARQ processes is 0, it indicates that no downlink transmission corresponding to the HARQ processes within a corresponding transmission period needs the HARQ feedback, and in this case, it may be determined not to receive the HARQ codebook. Both the base station and the terminal may release transmission resources determined for the HARQ codebook, and these transmission resources may be used for other purposes, so that effective utilization of the transmission resources may be improved.

It needs to be noted that in the examples of the disclosure, determining of the HARQ codebook with whatever size or the HARQ codebook determined in whatever condition is for a certain serving cell. For example, 'determining that the size of the HARQ codebook is 0 in a case that M is smaller than N and M is equal to 0' refers to that HARQ information corresponding to this serving cell does not need to be fed back in a case that the number of the HARQ processes enabled by this serving cell is 0, and the size of the HARQ codebook for this serving cell in the HARQ codebook is 0. In a case that the UE is further provided with another serving cell at the same time, and the number of the feedback-enabled HARQ processes in this another serving cell is greater than 0, the HARQ codebook still includes the HARQ feedback for this another serving cell.

That is, in the examples of the disclosure, processing of the HARQ codebook is for a single cell. In a case that different cells may use the above method or a method in related art, HARQ codebooks for corresponding cells are determined respectively. For example, in a case that one UE has two serving cells, two HARQ codebooks may be determined respectively according to the above method. In a case that the UE has a plurality of serving cells, a size of an HARQ codebook for one serving cell is 0, which does not affect a size of an HARQ codebook for another serving cell.

In another example, even if the number of scheduled feedback-enabled HARQ processes is 0, a semi-static characteristic of the HARQ codebook is still considered, transmission of the HARQ codebook is still maintained between the terminal and the base station, but the HARQ feedbacks carried by the HARQ codebook transmitted in this case may be discarded. In the examples of the disclosure, the HARQ codebook will carry one or more HARQ feedbacks as the preset value.

In this case, the base station, after receiving corresponding HARQ codebook, may directly discard the HARQ codebook without decoding, so decoding overhead of the base station is reduced.

In some examples, a sequence of the HARQ feedbacks in the HARQ codebook is determined according to identifications (IDs) of the scheduled HARQ processes corresponding to the HARQ feedbacks. Alternatively, the sequence of the HARQ feedbacks in the HARQ codebook is determined according to the scheduled K1 values corresponding to the HARQ feedbacks.

One HARQ codebook may carry the HARQ feedbacks for a plurality of downlink transmissions at the same time. The sequence of these HARQ feedbacks in the HARQ codebook may be determined according to the process IDs of the HARQ processes or according to the K1 values corresponding to these HARQ feedbacks.

The sequence of inserting the HARQ feedbacks into the HARQ codebook may be according to one of: the process IDs from large to small, the process IDs from small to large, the scheduled K1 values from large to small, or the scheduled K1 values from small to large. There are various implementations, which are not limited to the above examples.

It is assumed that an HARQ feedback for one TB is carried by one bit in the HARQ codebook. It is assumed that eight K1 values are configured and five feedback-enabled HARQ processes are configured, so the size of the HARQ codebook is 5 bits. It is assumed that the scheduled feedback-enabled HARQ processes include: a feedback-enabled HARQ process #1, a feedback-enabled HARQ process #3, a feedback-enabled HARQ process #7 and a feedback-enabled HARQ process #8. A feedback-enabled HARQ process #5 is unscheduled.

In a case that in downlink transmissions corresponding to the scheduled feedback-enabled HARQ process #1, the scheduled feedback-enabled HARQ process #3, the scheduled feedback-enabled HARQ process #7 and the scheduled feedback-enabled HARQ process #8, merely the downlink transmission corresponding to the scheduled feedback-enabled HARQ process #3 is received unsuccessfully, and the others are received successfully, according to different sequencing modes of the HARQ feedbacks in the HARQ codebook, a distribution of NACKs and ACKs carried in the HARQ codebook may be shown in FIG. 4A to FIG. 4C.

As for the scheduled feedback-enabled HARQ processes and the unscheduled feedback-enabled HARQ processes, sequencing is performed uniformly according to the process IDs from small to large, so NACKs and ACKs carried by the HARQ codebook composed of the 5 bits are shown in FIG. 4A.

As for the scheduled feedback-enabled HARQ processes and the unscheduled feedback-enabled HARQ processes, sequencing is performed according to the process IDs of the scheduled feedback-enabled HARQ processes from small to large, and the preset value (taking the preset value being NACK in FIG. 4A to FIG. 4C as an example) corresponding to the unscheduled feedback-enabled HARQ processes is written in a tail of the HARQ codebook, so NACKs and ACKs carried by the HARQ codebook composed of the 5 bits are shown in FIG. 4B.

As for the HARQ feedbacks for the scheduled feedback-enabled HARQ processes, sequencing is performed according to the scheduled K1 values from large to small, so NACKs and ACKs carried by the HARQ codebook composed of the 5 bits are shown in FIG. 4C.

In some examples, the downlink transmission includes at least one of:

a physical downlink shared channel (PDSCH) transmission; or a scheduling transmission released by a semi-persistent physical downlink shared channel.

In related art, the UE establishes the Type-1 codebook according to the number of K1 values configured by the RRC, so in a case that M feedback-enabled HARQ processes and N K1 values are configured for the UE and M<N, the UE may decide redundant feedback resources, causing redundancy of an uplink feedback. The examples of the disclosure solves the above-mentioned problem. In view of this, the UE does not perform, in the Type-1 codebook, feedback on the PDSCH scheduled by the DCI and including at least one of non-numerical K1 value or an HARQ process ID of a disabled HARQ process.

In a case that the UE is configured with M feedback-enabled HARQ processes and N K1 values by the RRC, the UE generates a type-1 HARQ-ACK codebook feedback according to a value of min {M, N}.

In a case that N<=M, the type-1 codebook is established according to the number of the configured K1 values. In this case, the size of the established codebook is uncorrelated with the M value and correlated with the number N of the K1 values.

As for N>M, in a case that M feedback-enabled HARQ processes are fed back in the same codebook, the base station sequences the HARQ feedbacks in the HARQ codebook (codebook for short) from large to small according to the scheduled K1 values in the feedback-enabled HARQ processes.

For example, M=2, N={1, 2, 4, 8, 9, 10, 12, 15}, DCI #1 schedules K1=15, and DCI #2 schedules K1=4. In this case, the UE needs to decide merely two values, namely, the feedback-enabled HARQ process #1 of the PDSCH transmission scheduled by the DCI #1, and the feedback-enabled HARQ process #2 of the PDSCH transmission scheduled by the DCI #2. In this case, the size of the HARQ codebook is determined according to M being equal to 2. Moreover, the HARQ processes corresponding to the HARQ feedbacks inserted into the HARQ codebook are the feedback-enabled HARQ process #2 and the feedback-enabled HARQ process #1 in sequence.

In a case that [1, M) feedback-enabled HARQ processes are fed back in the same codebook, remaining bits may be filled with NACK or ACK. For example, it is merely received, in a lookback window of a feedback time slot, that the DCI #1 schedules K1=15 and the others are disabled HARQ processes, so a feedback result for the PDSCH scheduled by the DCI #1 is enable #1, and NACK is filled in enabled #2. The lookback window is the configured K1 value.

Table 1 uses the type-1 codebook to feedback, needing 16 bits.

TABLE 1

| Frequency\time | K1 value #1 | K1 value #2 | K1 value . . . | K1 value #8 |
|---|---|---|---|---|
| Serving cell #1 | A number of most possibly scheduled PDSCHs within a single time slot (Entry set) #1 (time domain resource | A number of most possibly scheduled PDSCHs within a single time slot (Entry set) #2 (TDRA) | A number of most possibly scheduled PDSCHs within a single time slot (Entry set) # . . . (TDRA) | A number of most possibly scheduled PDSCHs within a single time slot (Entry set) #8 (TDRA) |

TABLE 1-continued

| Frequency\time | K1 value #1 | K1 value #2 | K1 value . . . | K1 value #8 |
|---|---|---|---|---|
| Serving cell #2 | allocation (TDRA)) A number of most possibly scheduled PDSCHs within a single time slot (Entry set) #5 (TDRA) | A number of most possibly scheduled PDSCHs within a single time slot (Entry set) #6 (TDRA) | A number of most possibly scheduled PDSCHs within a single time slot (Entry set) # . . . (TDRA) | A number of most possibly scheduled PDSCHs within a single time slot (Entry set) #16 (TDRA) |

Table 2 uses the proposed type-1 codebook to feedback, needing merely 4 bits

TABLE 2

| Frequency\time | Feedback-enabled HARQ process #1 | Feedback-enabled HARQ process #2 |
|---|---|---|
| Serving cell #1 | Entry set #1 (TDRA) | Entry set #2 (TDRA) |
| Serving cell #2 | Entry set #3 (TDRA) | Entry set #4 (TDRA) |

It is to be noted that each element in at least one of Table 1 or Table 2 is independent. These elements are listed in the same table as an example, which does not represent that all the elements in the table have to be present at the same time as shown in the table. A value of each element does not rely on a value of any other element in Table 1. Thus, those skilled in the art may understand that a value of each element in Table 1 is an independent example.

As shown in FIG. 6, an example of the disclosure provides an HARQ codebook processing apparatus. The HARQ codebook processing apparatus includes a first determining module 110.

The first determining module 110 is configured to determine a size of an HARQ codebook according to a number N of configured K1 values and a number M of configured feedback-enabled HARQ processes.

The HARQ codebook carries an HARQ feedback for a downlink transmission.

The K1 values each indicate a time offset between a transmission resource for the HARQ feedback and a transmission resource for the downlink transmission.

The HARQ codebook processing apparatus provided by the example of the disclosure may be included in a terminal.

In some examples, the first determining module 110 may be a program module. The program module, after executed by one or more processors, will determine the size of the HARQ codebook according to the number of the configured K1 values and the number of the configured feedback-enabled HARQ processes.

In some examples, the first determining module 110 may be a software and hardware combined module. The software and hardware combined module includes but is not limited to: various programmable arrays. The programmable arrays include but are not limited to at least one of a field programmable array or a complex programmable array.

In yet some other examples, the first determining module 110 may be a pure hardware module. The pure hardware module includes but is not limited to an application-specific integrated circuit.

In some examples, the first determining module 110 is configured to determine the size of the HARQ codebook according to min {M, N}.

In some examples, the first determining module 110 is configured to perform at least one of:

determining that the size of the HARQ codebook is 0 in a case that M is smaller than N and M is equal to 0; or determining the size of the HARQ codebook according to min {M, N} and an HARQ feedback strategy in a case that M is greater than 0.

In some examples, the HARQ codebook processing apparatus 110 further includes: a second determining module, configured to determine a feedback time unit for transmitting the HARQ feedback according to scheduled K1 value and a time slot where the downlink transmission corresponding to the HARQ feedback is located; and a first deciding module, configured to decide, on the feedback time unit, a transmission resource with a size being equal to the size of the HARQ codebook.

In some examples, the number of scheduled feedback-enabled HARQ processes is smaller than the number of the configured feedback-enabled HARQ processes, and the HARQ feedback carried by the HARQ codebook includes at least one of:

an HARQ feedback determined according to a receiving condition for the downlink transmission corresponding to the scheduled feedback-enabled HARQ process; or an HARQ feedback for an unscheduled feedback-enabled HARQ process, where the HARQ feedback for the unscheduled feedback-enabled HARQ process is a preset value, and the preset value is non acknowledgement (NACK) or acknowledgement (ACK).

In some examples, the HARQ codebook processing apparatus 110 further includes a third determining module. The third determining module is configured to determine not to feedback the HARQ codebook in a case that the number of scheduled feedback-enabled HARQ processes is 0. Alternatively, the third determining module is configured to determine that the HARQ codebook carries a preset value in a case that the number of scheduled feedback-enabled HARQ processes is 0, where the preset value is NACK or ACK.

It needs to be noted that in the examples of the disclosure, determining of the HARQ codebook with whatever size or the HARQ codebook determined in whatever condition is for a certain serving cell. For example, 'determining that the size of the HARQ codebook is 0 in a case that M is smaller than N and M is equal to 0' refers to that HARQ information corresponding to this serving cell does not need to be fed back in a case that the number of the HARQ processes enabled by this serving cell is 0, and the size of the HARQ codebook for this serving cell in the HARQ codebook is 0. In a case that the UE is further provided with another serving cell at the same time, and the number of the feedback-enabled HARQ processes in this another serving cell is greater than 0, the HARQ codebook still includes the HARQ feedback for this another serving cell.

That is, in the examples of the disclosure, processing of the HARQ codebook is for a single cell. In a case that different cells may use the above method or a method in related art, HARQ codebooks for corresponding cells are determined respectively. For example, in a case that one UE has two serving cells, two HARQ codebooks may be determined respectively according to the above method. In a case that the UE has a plurality of serving cells, a size of an HARQ codebook for one serving cell is 0, which does not affect a size of an HARQ codebook for another serving cell.

In some examples, a sequence of the HARQ feedbacks in the HARQ codebook is determined according to identifications (IDs) of the scheduled HARQ processes corresponding to the HARQ feedbacks.

Alternatively, the sequence of the HARQ feedbacks in the HARQ codebook is determined according to the scheduled K1 values corresponding to the HARQ feedbacks.

Alternatively, the sequence of the HARQ feedbacks in the HARQ codebook is determined according to IDs of the feedback-enabled HARQ processes corresponding to the HARQ feedbacks.

In some examples, the downlink transmission includes at least one of:

a physical downlink shared channel (PDSCH) transmission; or a scheduling transmission released by a semi-persistent physical downlink shared channel.

It is to be noted that one or more of the above second determining module to the third determining module and the first deciding module may be program modules, programmable array modules or pure hardware modules, which have various implementations and are not limited to the above examples.

As shown in FIG. 7, an example of the disclosure provides a hybrid automatic repeat request (HARQ) codebook processing apparatus. The HARQ codebook processing apparatus includes a fourth determining module 210, configured to determine a size of an HARQ codebook according to a number N of configured K1 values and a number M of configured feedback-enabled HARQ processes.

The HARQ codebook carries an HARQ feedback for a downlink transmission.

The K1 values each indicate a time offset between a transmission resource for the HARQ feedback and a transmission resource for the downlink transmission.

In some examples, the fourth determining module 210 may be a program module. The program module, after executed by one or more processors, will determine the size of the HARQ codebook according to the number of the configured K1 values and the number of the configured feedback-enabled HARQ processes.

In some examples, the fourth determining module 210 may be a software and hardware combined module. The software and hardware combined module includes but is not limited to various programmable arrays. The programmable arrays include but are not limited to at least one of a field programmable array or a complex programmable array.

In yet some other examples, the fourth determining module 210 may be a pure hardware module. The pure hardware module includes but is not limited to an application-specific integrated circuit.

In some examples, the fourth determining module 210 is configured to determine the size of the HARQ codebook according to min {M, N}.

In some examples, the fourth determining module 210 is configured to perform at least one of:

determining that the size of the HARQ codebook is 0 in a case that M is smaller than N and M is equal to 0; or determining the size of the HARQ codebook according to min {M, N} and an HARQ feedback strategy in a case that M is greater than 0.

In some examples, the HARQ codebook processing apparatus further includes: a fifth determining module, configured to determine a feedback time unit for transmitting the HARQ feedback according to scheduled K1 value and a time slot where the downlink transmission corresponding to the HARQ feedback is located; and a second deciding module, configured to decide, on the feedback time unit, a transmission resource with a size being equal to the size of the HARQ codebook.

In some examples, the number of scheduled feedback-enabled HARQ processes is smaller than the number of the configured feedback-enabled HARQ processes, and the HARQ feedback carried by the HARQ codebook includes at least one of:

an HARQ feedback determined according to a receiving condition for the downlink transmission corresponding to the scheduled feedback-enabled HARQ process; or an HARQ feedback for an unscheduled feedback-enabled HARQ process, where the HARQ feedback for the unscheduled feedback-enabled HARQ process is a preset value, and the preset value is non acknowledgement (NACK) or acknowledgement (ACK).

In some examples, the HARQ codebook processing apparatus further includes a sixth determining module. The sixth determining module is configured to determine not to receive the HARQ codebook in a case that the number of scheduled feedback-enabled HARQ processes is 0. Alternatively, the sixth determining module is configured to determine that the HARQ codebook carries a preset value in a case that the number of scheduled feedback-enabled HARQ processes is 0, where the preset value is NACK or ACK.

In some examples, a sequence of the HARQ feedbacks in the HARQ codebook is determined according to identifications (IDs) of the scheduled HARQ processes corresponding to the HARQ feedbacks.

Alternatively, the sequence of the HARQ feedbacks in the HARQ codebook is determined according to the scheduled K1 values corresponding to the HARQ feedbacks.

Alternatively, the sequence of the HARQ feedbacks in the HARQ codebook is determined according to IDs of the feedback-enabled HARQ processes corresponding to the HARQ feedbacks.

In some examples, the downlink transmission includes at least one of:

a physical downlink shared channel (PDSCH) transmission; or a scheduling transmission released by a semi-persistent physical downlink shared channel.

It is to be noted that one or more of the above sixth determining module and the second deciding module may be program modules, programmable array modules or pure hardware modules, which have various implementations and are not limited to the above examples.

An example of the disclosure provides a communication device, including:

a memory configured to store a processor-executable instruction; and one or more processors, connected with the memory;

where the one or more processors are configured to perform the HARQ codebook processing method provided by any above methods.

The one or more processors may include various types of storage media. The storage medium is a non-transitory computer storage medium and can continue memorizing information stored thereon after the communication device has a power failure.

The communication device includes a base station or a UE (or called a terminal).

The one or more processors may be connected with the memory through a bus and the like and configured to read an executable program stored on the memory, for example, at least one of methods shown in FIG. 2, FIG. 3 or FIG. 5.

Figure 8:
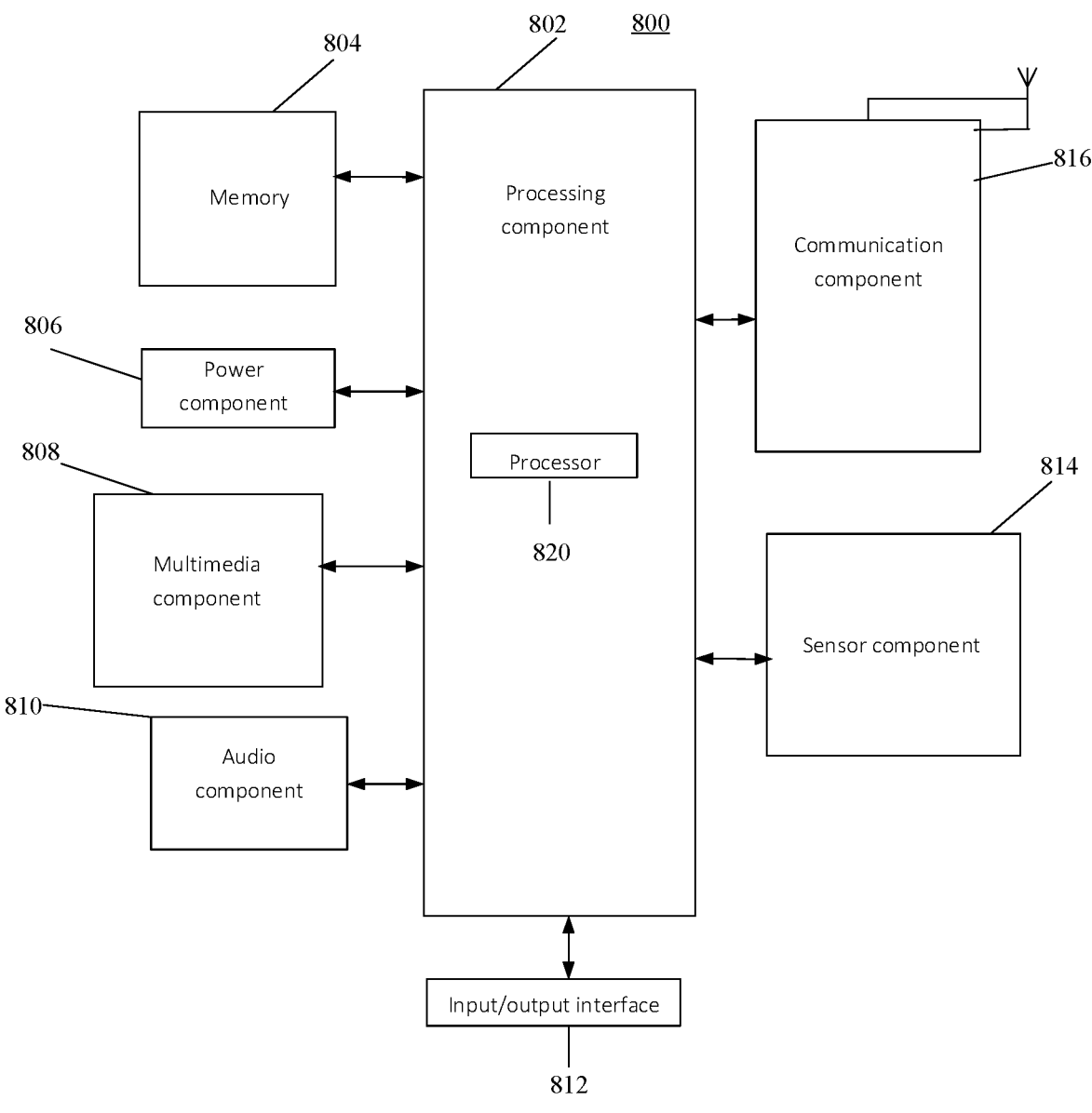
FIG. 8 is a schematic structural diagram of a UE according to an example.

FIG. 8 is a block diagram of UE 800 according to an example. For example, the UE 800 may be a mobile phone, a computer, digital broadcast user equipment, a messaging device, a game console, a tablet device, a medical device, a fitness facility, a personal digital assistant and the like.

Referring to FIG. 8, the UE 800 may include one or more components as follows: a processing component 802, a memory 804, a power component 806, a multimedia component 808, an audio component 810, an input/output (I/O) interface 812, a sensor component 814 and a communication component 816.

The processing component 802 generally controls the whole operation of the UE 800, such as operations related to display, phone call, data communication, camera operation and recording operation. The processing component 802 may include one or more processors 820 for executing instructions so as to complete all or part of steps of the above methods. Furthermore, the processing component 802 may include one or more modules to facilitate interaction between the processing component 802 and the other components. For example, the processing component 802 may include a multimedia module so as to facilitate interaction between the multimedia component 808 and the processing component 802.

The memory 804 is configured to store various types of data so as to support operations on the UE 800. Examples of these data include instructions of any application program or method for operation on the UE 800, contact person data, telephone directory data, messages, pictures, videos and the like. The memory 804 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 806 provides power for various components of the UE 800. The power component 806 may include a power management system, one or more power sources, and other components related to power generation, management and distribution for the UE 800.

The multimedia component 808 includes a screen which provides an output interface between the UE 800 and a user. In some examples, the screen may include a liquid crystal display (LCD) and a touch panel (TP). In a case that the screen includes the touch panel, the screen may be implemented as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to touching or swiping operation. In some examples, the multimedia component 808 includes at least one a front camera or a back camera. When the UE 800 is in an operation mode, such as a photographing mode or a video mode, the front camera and/or the back camera can receive external multimedia data. Each front camera and each back camera may be a fixed optical lens system or have a focal length and an optical zoom capability.

The audio component 810 is configured to output and/or input an audio signal. For example, the audio component 810 includes a microphone (MIC). When the UE 800 is in the operation mode, such as a call mode, a recording mode and a voice recognition mode, the microphone is configured to receive an external audio signal. The received audio signal may be further stored in the memory 804 or sent via the communication component 816. In some examples, the audio component 810 further includes a speaker for outputting the audio signal.

The I/O interface 812 provides an interface between the processing component 802 and a peripheral interface module. The above peripheral interface module may be a keyboard, a click wheel, buttons and the like. These buttons may include but are not limited to: a home button, a volume button, a start button and a lock button.

The sensor component 814 includes one or more sensors, configured to provide state evaluation of various aspects for the UE 800. For example, the sensor component 814 may detect an on/off state of the UE 800 and relative positioning of the components, for example, the components are a display and a keypad of the UE 800. The sensor component 814 may further detect location change of the UE 800 or one component of the UE 800, whether there is contact between the user and the UE 800, azimuth or speed up/speed down of the UE 800 and temperature change of the UE 800. The sensor component 814 may include a proximity sensor, configured to detect existence of a nearby object without any physical contact. The sensor component 814 may further include an optical sensor, such as a CMOS or CCD image sensor, for use in imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the UE 800 and other devices. The UE 800 may be accessed to a wireless network based on a communication standard, such as WiFi, 2G or 3G, or their combination. In an example, the communication component 816 receives a broadcast signal or related broadcast information from an external broadcast management system via a broadcast channel. In an example, the communication component 816 further includes a near-field communication (NFC) module so as to facilitate short-range communication. For example, the NFC module may be implemented based on a radio frequency identification (RFID) technology, an infra-red data association (IrDA) technology, an ultra wide band (UWB) technology, a Bluetooth (BT) technology and other technologies.

In an example, the UE 800 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or another electronic element, so as to perform the above methods.

In an example, a non-transitory computer-readable storage medium including instructions is further provided, such as the memory 804 including the instructions. The above instructions may be executed by the processor 820 of the UE 800 so as to complete the above methods. For example, the non-transitory computer-readable storage medium may be an ROM, a random access memory (RAM), a CD-ROM, a magnetic tape, a floppy disk, an optical data storage device and the like.

Figure 9:
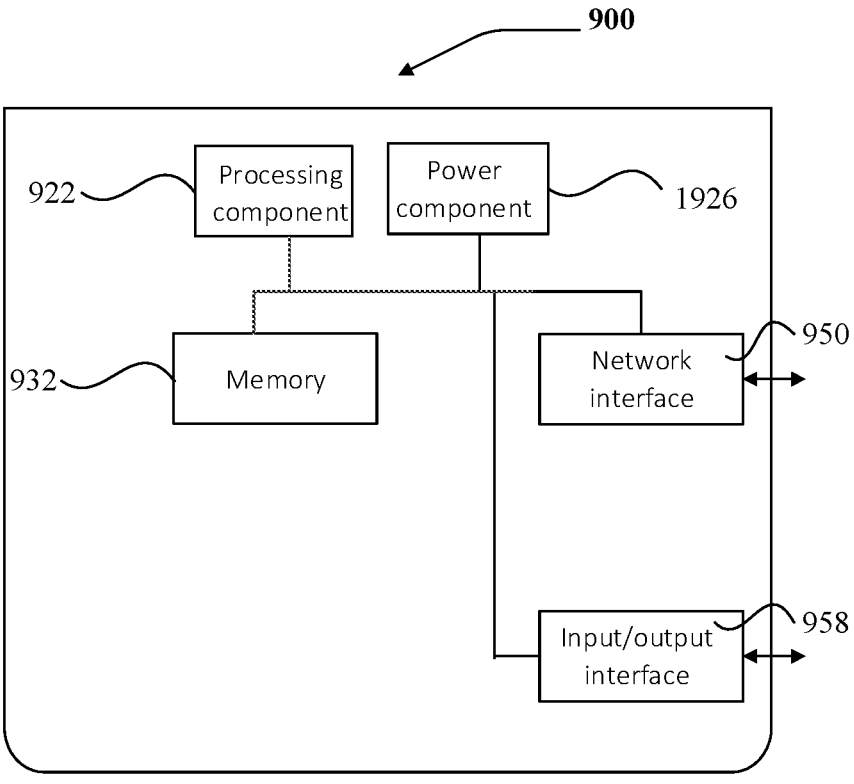
FIG. 9 is a schematic structural diagram of a communication device according to an example.

As shown in FIG. 9, an example of the disclosure provides a structure of a base station. For example, the base station 900 may be provided as a network device.

Referring to FIG. 9, the base station 900 includes a processing component 922 which further includes one or more processors and a memory resource represented by a memory 932, configured to store an instruction capable of being executed by the processing component 922, for example, an application program. The application program stored in the memory 932 may include one or more modules each of which corresponds to a set of instructions. Furthermore, the processing component 922 is configured to execute an instruction so as to perform any methods applied to the terminal and/or the base station described above, for example, the methods shown in FIG. 2, FIG. 3 or FIG. 5.

The base station 900 may further include a power component 1926 configured to execute power management of the base station 900, a wired or wireless network interface 950 configured to connect the base station 900 to a network, and an input/output (I/O) interface 958. The base station 900 may operate an operating system stored in the memory 932, for example, Windows Server™, Mac OS X™, Unix™, Linux™, FreeBSD™ or the like.

According to the technical solutions provided by the examples of the disclosure, the size of the HARQ codebook is determined according to the number of the configured K1 values and the number of the configured feedback-enabled HARQ processes, in this way, factors of two aspects such as the number of the configured K1 values and the number of the configured feedback-enabled HARQ processes are comprehensively considered for determining the size of the HARQ codebook, a phenomenon of too large redundancy in the HARQ codebook or high frequency of too large redundancy due to the HARQ codebook being configured very large in a case that the number of the configured feedback-enabled HARQ processes is small is at least reduced, and average overhead of the HARQ codebook is reduced. Furthermore, the size of the HARQ codebook is determined according to the number of the configured K1 values and the number of the configured feedback-enabled HARQ processes and not according to scheduling of the feedback-enabled HARQ processes and/or scheduling of the K1 values, so a semi-static characteristic of the HARQ codebook may be maintained.

Those skilled in the art will easily figure out other implementations of the disclosure after considering the specification and practicing the disclosure disclosed. The disclosure intends to cover any variation, use or adaptive change of the disclosure. These variations, uses or adaptive changes conform to a general principle of the disclosure and include common general knowledge or conventional technical means in the technical field not disclosed by the disclosure. The specification and the examples are regarded as examples, and the true scope and spirit of the disclosure are indicated by the following claims.

It is to be understood that the disclosure is not limited to an accurate structure described above and shown in the accompanying drawings, and various modifications and changes can be made without departing from its scope. The scope of the disclosure is limited by the appended claims.

The invention claimed is:

1. A hybrid automatic repeat request (HARQ) codebook processing method, executed by a terminal and comprising:
    determining a size of an HARQ codebook according to a number N of configured K1 values and a number M of configured feedback-enabled HARQ processes,
    wherein the HARQ codebook carries an HARQ feedback for a downlink transmission; and
    the K1 values each indicate a time offset between a transmission resource for the HARQ feedback and a transmission resource for the downlink transmission.

2. The HARQ codebook processing method according to claim 1, wherein determining the size of the HARQ codebook according to the number N of the configured K1 values and the number M of the configured feedback-enabled HARQ processes comprises:
    determining the size of the HARQ codebook according to min {M, N}.

3. The HARQ codebook processing method according to claim 2, wherein determining the size of the HARQ codebook according to min {M, N} comprises at least one of:
    determining that the size of the HARQ codebook is 0 in a case that M is smaller than N and M is equal to 0; or
    determining the size of the HARQ codebook according to min {M, N} and an HARQ feedback strategy in a case that M is greater than 0.

4. The HARQ codebook processing method according to claim 1, further comprising:
    determining a feedback time unit for transmitting the HARQ feedback according to a scheduled K1 value and a time slot where the downlink transmission corresponding to the HARQ feedback is located; and
    deciding, on the feedback time unit, a transmission resource with a size being equal to the size of the HARQ codebook.

5. The HARQ codebook processing method according to claim 1, wherein a number of scheduled feedback-enabled HARQ processes is smaller than the number of the configured feedback-enabled HARQ processes, and the HARQ feedback carried by the HARQ codebook comprises at least one of:
    an HARQ feedback determined according to a receiving condition for the downlink transmission corresponding to the scheduled feedback-enabled HARQ process; or
    an HARQ feedback for an unscheduled feedback-enabled HARQ process, wherein the HARQ feedback for the unscheduled feedback-enabled HARQ process is a preset value, and the preset value is non acknowledgement (NACK) or acknowledgement (ACK).

6. The HARQ codebook processing method according to claim 1, further comprising at least one of:
    determining not to feedback the HARQ codebook in a case that a number of scheduled feedback-enabled HARQ processes is 0; or
    determining that the HARQ codebook carries a preset value in a case that the number of the scheduled feedback-enabled HARQ processes is 0, wherein the preset value is NACK or ACK.

7. The HARQ codebook processing method according to claim 1, wherein
    a sequence of the HARQ feedbacks in the HARQ codebook is determined according to one of:
    identifications (IDs) of scheduled HARQ processes corresponding to the HARQ feedbacks;
    scheduled K1 values corresponding to the HARQ feedbacks; or
    IDs of the feedback-enabled HARQ processes corresponding to the HARQ feedbacks.

8. The HARQ codebook processing method according to claim 1, wherein the downlink transmission comprises at least one of:

a physical downlink shared channel (PDSCH) transmission; or a scheduling transmission released by a semi-persistent physical downlink shared channel.

9. A non-transitory computer storage medium, storing an executable program; and the executable program, after performed by one or more processors, being capable of implementing the HARQ codebook processing method provided by claim 1.

10. A communication device, comprising one or more processors, a transceiver, a memory and an executable program stored on the memory and capable of being run by the one or more processors, wherein the one or more processors, when running the executable program, are configured to:

determine a size of an HARQ codebook according to a number N of configured K1 values and a number M of configured feedback-enabled HARQ processes, wherein the HARQ codebook carries an HARQ feedback for a downlink transmission; and the K1 values each indicate a time offset between a transmission resource for the HARQ feedback and a transmission resource for the downlink transmission.

11. A hybrid automatic repeat request (HARQ) codebook processing method, executed by a base station and comprising:

determining a size of an HARQ codebook according to a number N of configured K1 values and a number M of configured feedback-enabled HARQ processes, wherein the HARQ codebook carries an HARQ feedback for a downlink transmission; and the K1 values each indicate a time offset between a transmission resource for the HARQ feedback and a transmission resource for the downlink transmission.

12. The HARQ codebook processing method according to claim 11, wherein determining the size of the HARQ codebook according to the number N of the configured K1 values and the number M of the configured feedback-enabled HARQ processes comprises:

determining the size of the HARQ codebook according to min {M, N}.

13. The HARQ codebook processing method according to claim 12, wherein determining the size of the HARQ codebook according to min {M, N} comprises at least one of:

determining that the size of the HARQ codebook is 0 in a case that M is smaller than N and M is equal to 0; or determining the size of the HARQ codebook according to min {M, N} and an HARQ feedback strategy in a case that M is greater than 0.

14. The HARQ codebook processing method according to claim 11, further comprising:

determining a feedback time unit for transmitting the HARQ feedback according to a scheduled K1 value and a time slot where the downlink transmission corresponding to the HARQ feedback is located; and deciding, on the feedback time unit, a transmission resource with a size being equal to the size of the HARQ codebook.

15. The HARQ codebook processing method according to claim 11, wherein a number of scheduled feedback-enabled HARQ processes is smaller than the number of the configured feedback-enabled HARQ processes, and the HARQ feedback carried by the HARQ codebook comprises at least one of:

an HARQ feedback determined according to a receiving condition for the downlink transmission corresponding to the scheduled feedback-enabled HARQ process; or an HARQ feedback for an unscheduled feedback-enabled HARQ process, wherein the HARQ feedback for the unscheduled feedback-enabled HARQ process is a preset value, and the preset value is non acknowledgement (NACK) or acknowledgement (ACK).

16. The HARQ codebook processing method according to claim 11, further comprising at least one of:

determining not to receive the HARQ codebook in a case that a number of scheduled feedback-enabled HARQ processes is 0; or determining that the HARQ codebook carries a preset value in a case that the number of the scheduled feedback-enabled HARQ processes is 0, wherein the preset value is NACK or ACK.

17. The HARQ codebook processing method according to claim 11, wherein a sequence of the HARQ feedbacks in the HARQ codebook is determined according to one of:

identifications (IDs) of scheduled HARQ processes corresponding to the HARQ feedbacks;

scheduled K1 values corresponding to the HARQ feedbacks; or

IDs of the feedback-enabled HARQ processes corresponding to the HARQ feedbacks.

18. The HARQ codebook processing method according to claim 11, wherein the downlink transmission comprises at least one of:

a physical downlink shared channel (PDSCH) transmission; or a scheduling transmission released by a semi-persistent physical downlink shared channel.

19. A communication device, comprising one or more processors, a transceiver, a memory and an executable program stored on the memory and capable of being run by the one or more processors, wherein the one or more processors, when running the executable program, performs the HARQ codebook processing method provided by claim 11.

20. A non-transitory computer storage medium, storing an executable program; and the executable program, after performed by one or more processors, being capable of implementing the HARQ codebook processing method provided by claim 11.

\* \* \* \* \*